(12) United States Patent
Okuda et al.

(10) Patent No.: US 9,602,720 B2
(45) Date of Patent: Mar. 21, 2017

(54) PHOTOGRAPHING APPARATUS

(71) Applicant: SAMSUNG ELECTRONICS CO., LTD., Suwon-si, Gyeonggi-do (KR)

(72) Inventors: Masaru Okuda, Yokohama (JP); Takeshi Matsuo, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 404 days.

(21) Appl. No.: 14/101,548

(22) Filed: Dec. 10, 2013

(65) Prior Publication Data

US 2014/0160234 A1   Jun. 12, 2014

(30) Foreign Application Priority Data

Dec. 10, 2012 (JP) ................. 2012-269518
Jul. 24, 2013 (KR) .......... 10-2013-0087604

(51) Int. Cl.
*H04N 5/232* (2006.01)
*H04N 5/247* (2006.01)
*H04N 5/225* (2006.01)
*H04N 5/262* (2006.01)

(52) U.S. Cl.
CPC ..... *H04N 5/23238* (2013.01); *H04N 5/23203* (2013.01); *H04N 5/2621* (2013.01)

(58) Field of Classification Search
None
See application file for complete search history.

(56) References Cited

U.S. PATENT DOCUMENTS

| 3,492,419 A * | 1/1970 | Bartonik | H04N 5/222 348/211.11 |
| 6,549,681 B1 * | 4/2003 | Takahashi | G06T 3/4038 358/450 |
| 8,350,892 B2 * | 1/2013 | Hayashi | H04N 5/232 348/36 |

(Continued)

FOREIGN PATENT DOCUMENTS

| JP | 07-067020 A | 3/1995 |
| JP | 09-093471 A | 4/1997 |

(Continued)

*Primary Examiner* — Reza Aghevli
(74) *Attorney, Agent, or Firm* — Drinker Biddle & Reath LLP

(57) ABSTRACT

An electronic apparatus includes a photography unit that captures a moving image and a still image, a transmitter that transmits the images captured by the photography unit to another electronic apparatus, a receiver that receives images captured by the other electronic apparatus from the other electronic apparatus, a common portion detector that detects a common portion between the images captured by the photography unit and the images received by the receiver, a combined moving image generation unit that generates a combined moving image that displays a positional relationship between the electronic apparatus and the other electronic apparatus, a display unit that displays the generated combined moving image, and a panorama image generation unit that generates the panorama image by overlapping and combining the still image captured by the photography unit, the still image captured by the other electronic apparatus, and the common portion, according to the positional relationship.

17 Claims, 9 Drawing Sheets

(56) References Cited

U.S. PATENT DOCUMENTS

| | | | |
|---|---|---|---|
| 2007/0182812 A1* | 8/2007 | Ritchey | H04N 5/2254 |
| | | | 348/36 |
| 2011/0092179 A1 | 4/2011 | Burgener et al. | |
| 2011/0096142 A1* | 4/2011 | Kiyoshige | H04N 5/23212 |
| | | | 348/36 |
| 2012/0300023 A1* | 11/2012 | Lee | H04N 5/23238 |
| | | | 348/36 |
| 2013/0195419 A1 | 8/2013 | Hayashi | |

FOREIGN PATENT DOCUMENTS

| | | | | |
|---|---|---|---|---|
| JP | 2005-515657 A | | 5/2005 | |
| JP | 2009-268037 A | | 11/2009 | |
| JP | EP 2453644 | * | 11/2011 | H04N 5/232 |
| JP | EP 2453645 | * | 11/2011 | H04N 5/232 |
| JP | EP 2555507 | * | 7/2012 | H04N 5/247 |

* cited by examiner

FIG. 6
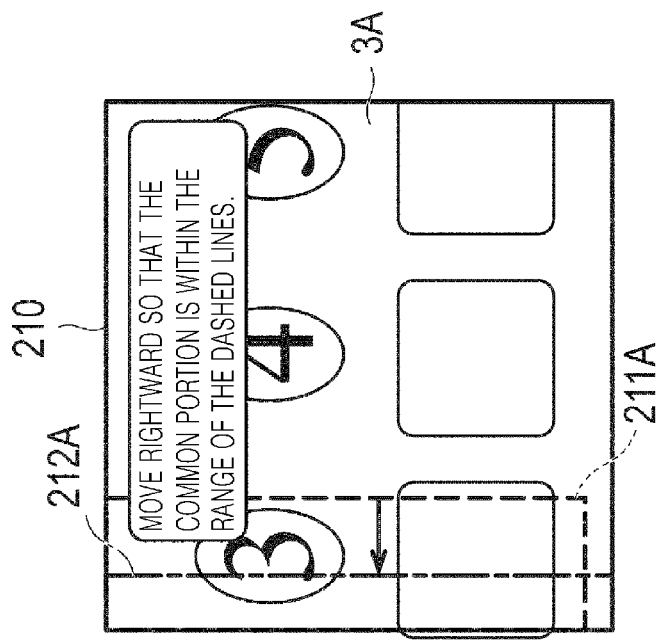
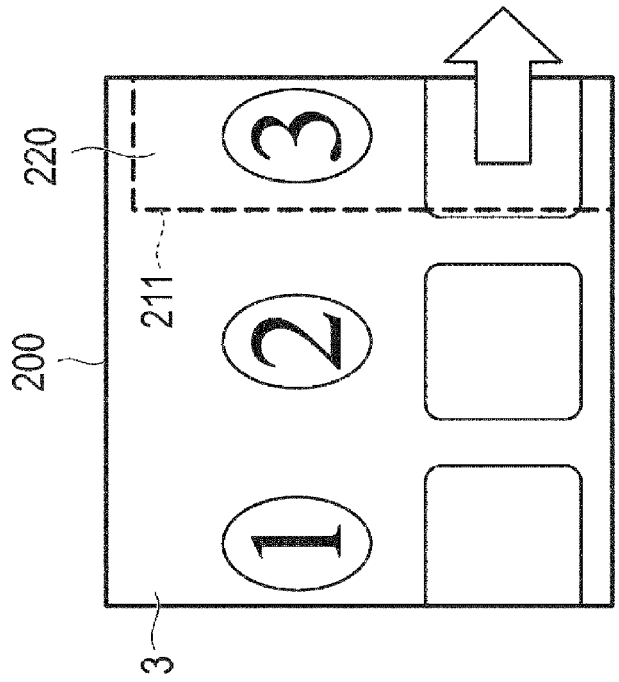

PHOTOGRAPHING APPARATUS

RELATED APPLICATIONS

This application claims the priority benefit of Japanese Patent Application No. 2012-269518, filed on Dec. 10, 2012, in the Japanese Intellectual Property Office, and Korean Patent Application No. 10-2013-0087604, filed on Jul. 24, 2013, in the Korean Intellectual Property Office, the disclosures of which are incorporated herein in their entirety by reference.

BACKGROUND

1. Field

One or more embodiments relate to an electronic apparatus (e.g., a photographing apparatus), and more particularly, to an electronic apparatus for capturing a panorama image.

2. Description of the Related Art

In general, a panorama image is generated by capturing still images having overlapping portions, and then connecting the still images by matching and combining the overlapping portions. In this regard, if the still images are not appropriately overlapped, such as in a case where the still images have insufficient overlapping portions, it is difficult to generate the panorama image.

According to the related art, in order to appropriately overlap the still images of the panorama image, a camera is connected to a computer, and while full-size captured still images are being transmitted from the camera to the computer, simultaneously, identification images that are smaller than the still images are always transmitted. Also, the camera is moved so that identification images at the time when capturing the still images displayed on a computer screen appropriately overlap a current identification image, and thus is set at a position for capturing a following still image. By using the method described above, it is possible to quickly capture the panorama image.

SUMMARY

One or more embodiments include an electronic apparatus for quickly overlapping simultaneously captured still images by optimizing respective positions of electronic apparatuses that are respectively capturing the still images of a panorama image. Even when a subject is moving, the electronic apparatus may quickly capture the panorama image without having the subject be repeatedly included in the panorama image.

Additional aspects will be set forth in part in the description which follows and, in part, will become apparent from the description, or may be learned by practice of the presented embodiments.

According to one or more embodiments, an electronic apparatus captures a panorama image. The electronic apparatus includes a photography unit that captures a moving image and a still image; a transmitter that transmits the moving image and the still image captured by the photography unit to another electronic apparatus; a receiver that receives a moving image and a still image captured by the other electronic apparatus from the other electronic apparatus; a common portion detector that detects a common portion between the moving image captured by the photography unit and the moving image received by the receiver, and detects a common portion between the still image captured by the photography unit and the still image received by the receiver; a combined moving image generation unit that generates a combined moving image that displays a positional relationship between the electronic apparatus and the other electronic apparatus, where the combined moving image generation unit overlaps and combines the moving image captured by the photography unit, at least a portion of the moving image captured by the other electronic apparatus received by the receiver, and the common portion detected by the common portion detector; a display unit that displays the combined moving image generated by the combined moving image generation unit; and a panorama image generation unit that generates the panorama image by overlapping and combining the still image captured by the photography unit, the still image captured by the other electronic apparatus, and the common portion detected by the common portion detector, according to the positional relationship.

BRIEF DESCRIPTION OF THE DRAWINGS

These and/or other aspects will become apparent and more readily appreciated from the following description of the embodiments, taken in conjunction with the accompanying drawings of which:

FIGS. 6A and 6B are diagrams illustrating a screen for instructing a capturing position of another photographing apparatus to be moved, and a screen of the other photographing apparatus displaying a movement instruction, according to an embodiment;

DETAILED DESCRIPTION

Figure 1:
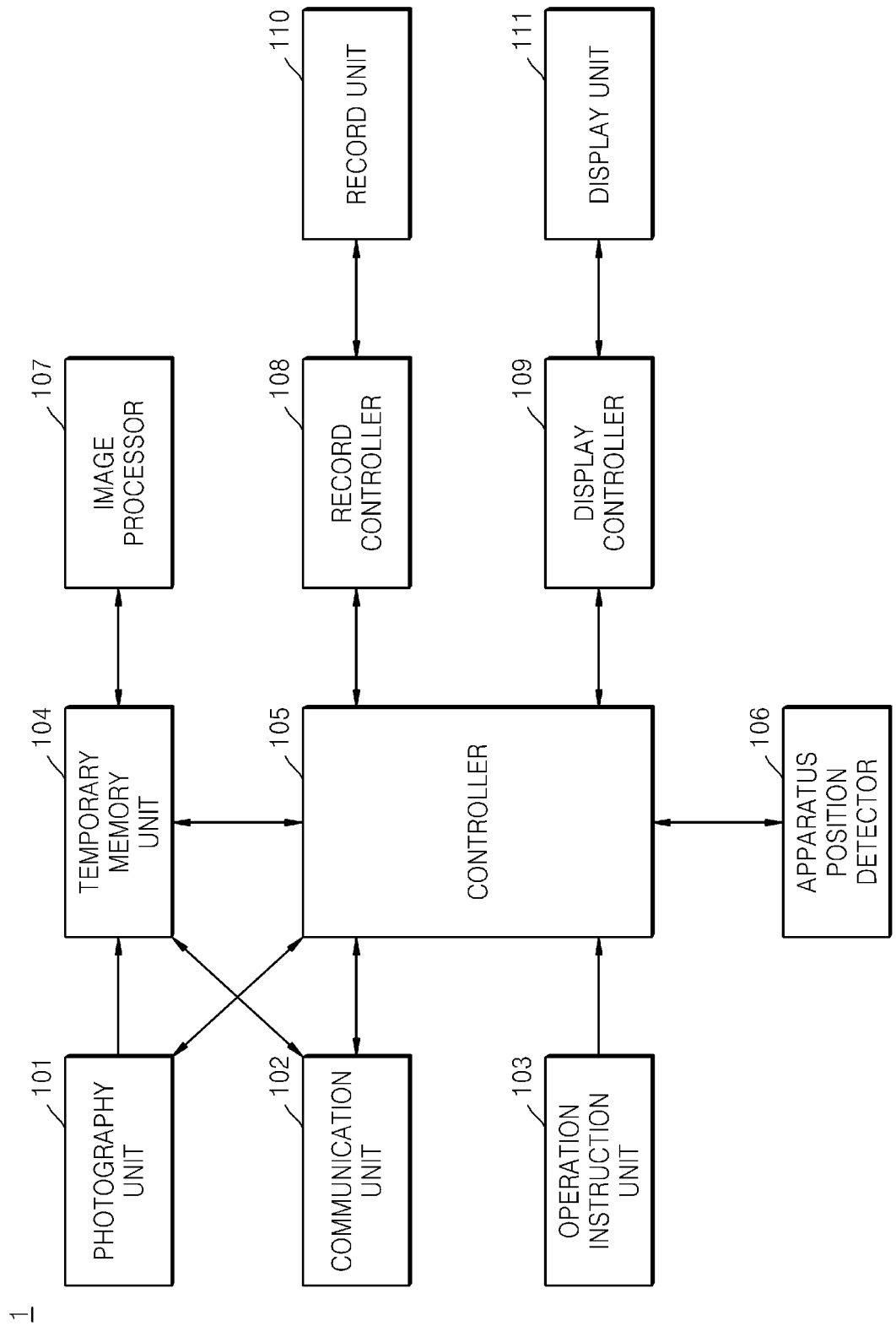
FIG. 1 is a block diagram of an electronic apparatus (e.g., a photographing apparatus), according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a block diagram of an electronic apparatus (e.g., a photographing apparatus) according to an embodiment. In other embodiments, the electronic apparatus may include a camera, mobile phone, PDA, or other electronic apparatuses having image capturing capabilities.

As illustrated in FIG. 1, the electronic apparatus 1 (e.g., the photographing apparatus 1) includes a photography unit 101, a communication unit 102, an operation instruction unit 103, a temporary memory unit 104, a controller 105, an apparatus position detector 106, an image processor 107, a record controller 108, a display controller 109, a record unit 110, and a display unit 111. The electronic apparatus 1 may be a camera, a mobile phone having a camera, etc.

An optical system and a flash unit are included in the photography unit 101. A receiver and a transmitter are included in the communication unit 102. A common portion detector is included in the controller 105 and the apparatus position detector 106. A combined moving image generation unit, a panorama image generation unit, and a panorama moving image generation unit are included in the controller 105, the apparatus position detector 106, the temporary memory unit 104, and the image processor 107. A display is included in the display controller 109 and the display unit 111. A photographing condition determination unit, a timing signal generation unit, a main photographing apparatus determination unit, an external apparatus inducing unit, an external apparatus adjustment unit, and a timer unit are included in the controller 105.

The photography unit 101 includes an optical system including a lens and an aperture, and an imaging device such as a charge-coupled device (CCD) image sensor or a complementary metal oxide semiconductor (CMOS) image sensor. Also, the photography unit 101 may further include a flash that temporarily emits light onto a subject when capturing a still image.

The photography unit 101 captures a still image and a moving image of the subject by using the imaging device, which receives an optical signal from the optical system and then converts the optical signal into an electrical signal.

A still image forms a portion of a panorama image. That is, the panorama image is generated by a combination process of overlapping, connecting, and matching overlapping portions of still images.

A moving image forms a portion of a combined moving image. That is, a panorama moving image is generated by a combination process of overlapping, connecting, and matching overlapping portions of moving images.

The photography unit 101 transmits the captured still image and moving image to the controller 105 or the temporary memory unit 104.

The communication unit 102 is a wireless communication interface, and may be configured of, for example, a wireless local area network (LAN) card. Alternatively, the communication unit 102 may be a wired communication interface. The communication unit 102 transmits or receives an image between the electronic apparatus 1 and another electronic apparatus (e.g., another photographing apparatus). The other electronic apparatus may be one or more electronic apparatuses other than the electronic apparatus 1. For convenience of description, functions of the other electronic apparatus are the same as functions of the electronic apparatus 1.

An image includes a still image, a moving image, a panorama image, a panorama moving image, and the combined moving image described hereinafter.

The communication unit 102 searches for the other electronic apparatus, and communicates with the other electronic apparatus. Unique identification information is provided to the other electronic apparatus so that even when there are other electronic apparatuses, the other electronic apparatuses may be independently detected. The communication unit 102 transmits an image received from the other electronic apparatus to the temporary memory unit 104. Also, the communication unit 102 transmits an image received from the temporary memory unit 104 to the other electronic apparatus.

The operation instruction unit 103 may be configured of various input buttons or a touch panel. The operation instruction unit 103 receives various instruction inputs from a user, and transmits the instruction inputs to the controller 105. The operation instruction unit 103 may receive various instructions, including a capture instruction for simultaneously capturing the still image by the electronic apparatus 1 and the other electronic apparatus, an inducing instruction for moving a position of the other electronic apparatus, and a conversion instruction for converting the electronic apparatus 1 into an apparatus that captures the panorama image as a group by panning the electronic apparatus 1.

The temporary memory unit 104 may be a volatile or a non-volatile memory device, such as dynamic random access memory (DRAM) or a hard disk drive (HDD).

The temporary memory unit 104 temporarily stores various received data. The temporary memory unit 104 stores images received from the photography unit 101, the communication unit 102, and the controller 105, or data regarding a controlling process.

The controller 105 may be a central processing unit (CPU).

The controller 105 controls elements of the electronic apparatus 1, and performs various operations while transmitting or receiving various data.

Based on the capture instruction of the user, the controller 105 generates a timing signal for simultaneously capturing the still image via the photography unit 101 and the other electronic apparatus. Based on the inducing instruction of the user, the controller 105 provides a display for making a capturing position of the other electronic apparatus move. The controller 105 converts the electronic apparatus 1 into an electronic apparatus that pans based on the user's conversion instruction, and combines a plurality of still images that are captured while panning by using the image processor 107, and thus generating the panorama image.

The apparatus position detector 106 may be configured as a program, or may include a global positioning system (GPS).

The apparatus position detector 106 detects a positional relationship between the electronic apparatus 1 and the other electronic apparatus. Also, the apparatus position detector 106 detects a common portion between the moving image captured by the photography unit 101 and a moving image captured by the other electronic apparatus. The common portion may be detected by extracting a distinctive point from each moving image, and combining the distinctive points. Likewise, the apparatus position detector 106 detects a common portion between the still image captured by the photography unit 101 and a still image captured by the other electronic apparatus. Then, the apparatus position detector 106 determines that electronic apparatuses, which have captured moving images or still images having the largest common portion, are the electronic apparatuses in the most adjacent positional relationship. Thus, the positional relationship between the electronic apparatus 1 and the other electronic apparatus may be detected.

When the common portion between the moving image captured by the photography unit 101 and the moving image captured by the other electronic apparatus are detected by the apparatus position detector 106, the controller 105 may zoom out the moving image captured by the photography unit 101 to a wide angle end. By doing so, a probability that the moving images captured by the electronic apparatuses have a common portion is increased. Thus, the time necessary to detect the common portion between the moving images may be reduced. In addition, the controller 105 may provide a display for instructing the moving image to be zoomed out to the wide angle end in the display unit 111, and for instructing the user to zoom the moving image to the wide angle end.

The apparatus position detector 106 transmits the positional relationship between the electronic apparatus 1 and the other electronic apparatus, and information regarding the common portion between the moving images and the common portion between the still images to the controller 105. The controller 105 transmits or stores the received positional relationship between the electronic apparatuses, and information regarding the common portion between the moving images and the common portion between the still images to or in the temporary memory unit 104.

The image processor 107 may be an MPU (Micro Processor Unit) or a program.

The image processor 107 generates the panorama image, the panorama moving image, and the combined moving image by performing an image process, such as combining and modifying, on the received image.

The image processor 107 generates the panorama moving image by overlapping the common portion between the moving images and then combining the moving images, based on the moving images and the information regarding the common portion between the moving images that are stored in the temporary memory unit 104. Likewise, the image processor 107 generates the panorama image by overlapping the common portion between the still images and then combining the still images, based on the still images stored in the temporary memory unit 104 and the information regarding the common portion between the still images.

Furthermore, from among the moving images stored in the temporary memory unit 104, the image processor 107 generates the combined moving image by overlapping and combining the moving image captured by the photography unit 101 and at least a portion of the moving image captured by the other electronic apparatuses adjacent to the electronic apparatus 1, and the common portion between the moving images. When generating the combined moving image, the image processor 107 may use the positional relationship between the electronic apparatuses that is stored in the temporary memory unit 104. The user may understand the positional relationship between the electronic apparatus 1 and a certain other electronic apparatus from the combined moving image.

Figure 2:
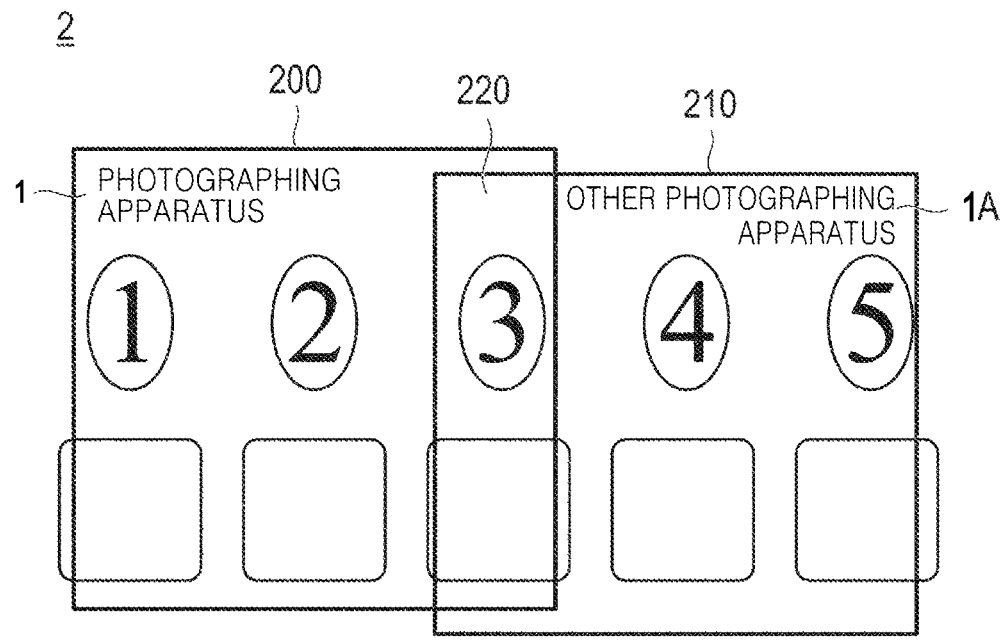
FIG. 2 is a diagram illustrating an example of a combined moving image, according to an embodiment.

FIG. 2 is a diagram illustrating an example of the combined moving image, according to an embodiment.

As illustrated in FIG. 2, a combined moving image 2 is generated by overlapping and combining a common portion between a moving image captured by the photographing apparatus 1 and a moving image captured by another photographing apparatus 1A adjacent to the photographing apparatus 1. A frame 200 includes frames of the moving image captured by the photographing apparatus 1; a frame 210 includes frames of the moving image captured by the other photographing apparatus 1A. Accordingly, moving images of a first subject, a second subject, and a third subject are captured by the photographing apparatus 1; moving images of the third subject, a fourth subject, and a fifth subject are captured by the other photographing apparatus 1A. Also, a portion that is outside the frames 200 and 210 and is originally not included in the moving images respectively captured by the photographing apparatuses 1 and 1A, is also displayed in the combined moving image 2 of FIG. 2, for convenience of description.

A common portion 220, which is an area formed by overlapping the frames 200 and 210, is the common portion between the moving image captured by the photographing apparatus 1 and the moving image captured by the other photographing apparatus 1A.

A positional relationship between the frames 200 and 210 reflects a positional relationship between the photographing apparatus 1 and the other photographing apparatus 1A. Therefore, the user may understand the positional relationship between the photographing apparatus 1 and the other photographing apparatus 1A from the combined moving image 2. According to the example illustrated in FIG. 2, since the frame 210 is at a position lower than the frame 200, it may be understood that the other photographing apparatus 1A is at a position lower than the photographing apparatus 1. Therefore, the user may recognize that the first subject may be completely captured by moving the photographing apparatus 1 more to the left or by shifting a photographing direction (e.g., a direction along an optical axis) to the left. Also, the user may recognize that a height of the photographing apparatus 1 may be the same as a height of the other photographing apparatus 1A by lowering the height of the photographing apparatus 1 or downwardly shifting the photographing direction.

Figure 3:
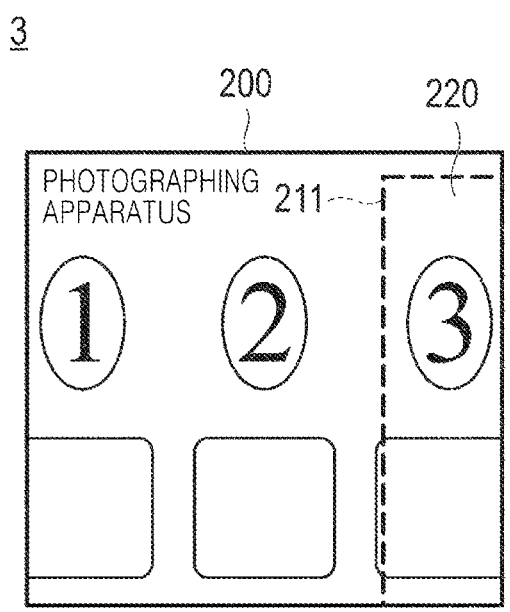
FIG. 3 is a diagram illustrating another example of a combined moving image, according to an embodiment.

FIG. 3 is a diagram illustrating another example of the combined moving image, according to an embodiment.

As illustrated in FIG. 3, a combined moving image 3 is generated by overlapping and combining the common portion between a moving image captured by the photographing apparatus 1 and a moving image captured by the other photographing apparatus 1A adjacent to the photographing apparatus 1. Unlike the combined moving image 2 of FIG. 2, which completely includes the moving image captured by the other photographing apparatus, the combined moving image 3 of FIG. 3 includes only a portion of the moving image captured by the other photographing apparatus.

In the combined moving image 3, of the moving image captured by the other photographing apparatus 1A, only a common portion 220 that is in common with the moving image of the photographing apparatus 1 is displayed, with a portion 211 of the frames of the moving image captured by the other photographing apparatus 1A. Accordingly, the positional relationship between the photographing apparatus 1 and the other photographing apparatus 1A may be identified from a positional relationship between the frame 200 of the moving image captured by the photographing apparatus 1 and the portion 211 of the frames of the moving image captured by the other photographing apparatus 1A, which is marked in the frame 200 so as to distinguish the frame 200 and the portion 211. Also, since a difference in the capturing positions of the photographing apparatus 1 and the other photographing apparatus 1A is emphasized by displaying the combined moving image 3, the positional relationship between the photographing apparatuses 1 and 1A may be more clearly displayed.

The record controller 108 may be configured as a driving circuit for inputting data to the record unit 110. The record controller 108 records a panorama image received from the controller 105 in the record unit 110. Also, the record controller 108 is controlled by the controller 105 to record various data in the record unit 110.

The record unit 110 may be a memory card.

The record unit 110 is operated by the record controller 108 to record various data such as the panorama image.

The display controller 109 may be configured as a driver circuit for driving the display unit 111. The display controller 109 displays the panorama image, the panorama moving image, and the combined moving image received from the controller 105 on the display unit 111. The display unit 111 may be a liquid crystal display (LCD). The display unit 111 is driven by the display controller 109 to display the panorama image, the panorama moving image, and the combined moving image.

Hereinafter, an operation of the electronic apparatus 1 (e.g., the photographing apparatus 1) when capturing a panorama image will be described.

Figure 4:
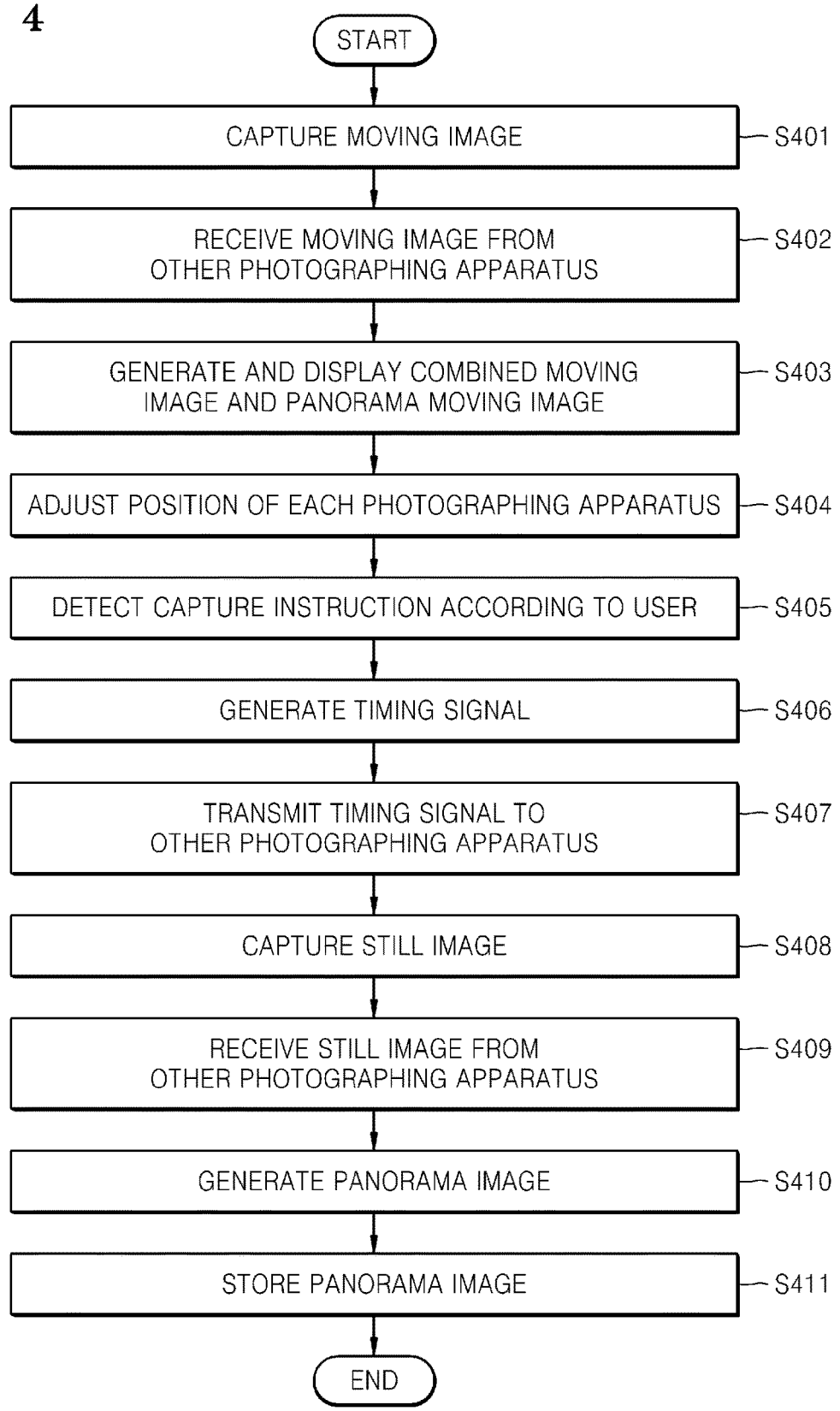
FIG. 4 is a flowchart illustrating an operation of a photographing apparatus when capturing a panorama image, according to an embodiment.

FIG. 4 is a flowchart illustrating the operation of the photographing apparatus 1 when capturing the panorama image, according to an embodiment.

When power is supplied to the photographing apparatus 1, the photography unit 101 captures a moving image of a subject (S401).

The communication unit 102 receives a moving image captured by the other photographing apparatus (e.g., the other photographing apparatus 1A) (S402).

The image processor 107 generates the combined moving image by overlapping and combining the common portion between the moving image captured by the photography unit 101 and all or a portion of the moving image captured by the other photographing apparatus adjacent to the photographing apparatus 1. Also, the image processor 107 generates the panorama moving image by overlapping and combining the common portion between the moving image captured by the photography unit 101 and all of the moving images captured by the other photographing apparatus. Then, the display unit 111 displays the combined moving image and the panorama moving image generated by the image processor 107 (S403).

Figure 5:
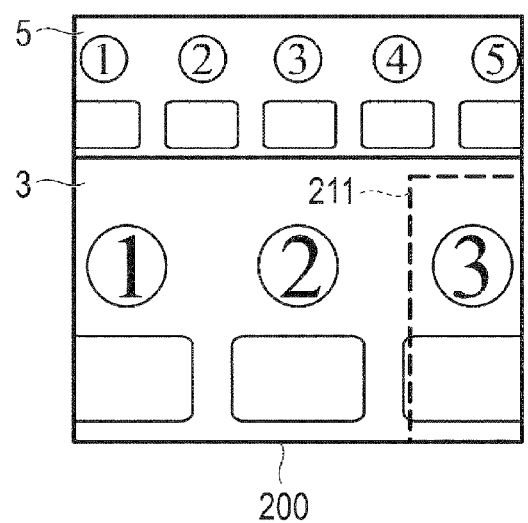
FIG. 5 is a diagram illustrating a screen of a display unit of a photographing apparatus, on which a combined moving image and a panorama moving image are simultaneously displayed, according to an embodiment.

FIG. 5 is a diagram illustrating a screen of the display unit 111 of the photographing apparatus 1, on which the combined moving image and the panorama moving image are simultaneously displayed, according to an embodiment.

As illustrated in FIG. 5, a panorama moving image 5 is displayed in an upper portion of the screen of the display unit 111, and a combined moving image 3 is displayed on a lower portion of the screen of the display unit 111. Thus, the combined moving image 3, which is generated by overlapping and combining the common portion between the moving image captured by the photography unit 101 and the moving image captured by the other photographing apparatus adjacent to the photographing apparatus 1, and the panorama moving image 5, which is generated by overlapping and combining the moving images captured by all of the photographing apparatuses, are displayed on the display unit 111. Therefore, since the user may understand the positional relationship between the photographing apparatus 1 and the other photographing apparatus adjacent to the photographing apparatus 1, the user may adjust the respective capturing positions of the photographing apparatuses and simultaneously, recognize the entire panorama image or a capturing range.

Also, the panorama image 5 may be generated by combining a received combined moving image that is combined in any one of the other photographing apparatuses.

Referring to FIG. 4, the user may appropriately adjust the positional relationship between the photographing apparatus 1 and the other photographing apparatus adjacent to the photographing apparatus 1, based on the positional relationship that is recognizably marked in the combined moving image 3 displayed on the display unit 111 (S404).

Here, a signal for making the capturing position of the other photographing apparatus move may be transmitted from the photographing apparatus 1, and the inducing instruction may be displayed on the other photographing apparatus. Thus, a user of the other photographing apparatus may be instructed to move the capturing position. The instruction as described above is provided when it is more appropriate that the user of the other photographing apparatus to change the capturing position of the other photographing apparatus than it is for the user of the photographing apparatus 1 to change the capturing position of the photographing apparatus 1.

FIGS. 6A and 6B are diagrams illustrating a screen for instructing that the capturing position of the other photographing apparatus be moved, and a screen of the other photographing apparatus displaying a movement instruction from the photographing apparatus 1, according to an embodiment.

FIG. 6A is a diagram illustrating a screen for making the capturing position of the other photographing apparatus move. The user may input the movement instruction for moving the capturing position of the other photographing apparatus by touching and sliding the common portion 220 with a finger. The common portion 220 is displayed as a portion of the combined moving image 3 displayed on the screen of the display unit 111. In FIG. 6A, the user instructs to move the capturing position of the other photographing apparatus so that the portion 211 of the frames of the moving image captured by the other photographing apparatus may be moved in a direction of an arrow. That is, the user is instructing the other photographing apparatus to move to the right so that a size of the common portion 220 is reduced. The movement instruction for moving the other photographing apparatus is transmitted from the photographing apparatus 1 to the other photographing apparatus.

FIG. 6B is the screen of the other photographing apparatus displaying a movement instruction from the photographing apparatus 1. A combined moving image 3A is displayed on the other photographing apparatus; and the movement instruction for moving the other photographing apparatus, received from the photographing apparatus 1, is displayed on the combined moving image 3A. The movement instruction for moving the capturing position of the other photographing apparatus is simply provided by displaying a frame 211A of the moving image captured by the photographing apparatus 1, an arrow showing a direction in which the frame 211A is to be moved, and a frame 212A that is the frame 211A after being moved. The frame 211A, the arrow, and the frame 212A are all displayed on the combined moving image 3A. That is, due to the displayed elements, the user of the other photographing apparatus may be able to recognize that the frame 211A has to be moved to a position of the frame 212A, and thus move the capturing position of the other photographing apparatus to the right. Also, in order to clarify the instruction for moving the other photographing apparatus, a sentence such as "Move rightward so that the common portion is within the range of the dashed lines" may be provided in the combined moving image 3A that is displayed on the other photographing apparatus.

Thus, the user of the photographing apparatus 1 may accurately make the capturing position of the other photographing apparatus move so that the positional relationship between the photographing apparatus 1 and the other photographing apparatus is appropriately set.

The combined moving image 3 in the lower portion of FIG. 5 may be displayed on a screen of FIG. 6A.

Alternatively, a combined external moving image, which is generated by overlapping and combining a common portion between moving images respectively captured by other adjacent photographing apparatuses, may be displayed in the lower portion of FIG. 5. Also, as illustrated in the lower portion of FIG. 5, the user may select a position for displaying the panorama moving image 5 displayed in the upper portion of FIG. 5. Therefore, instructions for moving the capturing position may be provided to respective users of the other photographing apparatuses by displaying the combined moving image in the lower portion of FIG. 5 or the combined external moving image on the screen of FIG. 6A, and sequentially displaying relative positional relationships of mutually adjacent photographing apparatuses regarding the photographing apparatus 1 and all of the other photographing apparatuses.

Referring to FIG. 4, when the respective capturing positions of the photographing apparatuses are adjusted, the user of the photographing apparatus 1 presses a shutter button, and then, a still image capture instruction is inputted to the operation instruction unit 103. Thus, the controller 105 detects the still image capture instruction of the user (S405).

When the still image capture instruction is detected, the controller 105 generates the timing signal for setting a time for simultaneously capturing the still image via the photography unit 101 and the other photographing apparatus (S406).

The timing signal is generated by a main photographing apparatus that is determined to generate the panorama image, from among the photographing apparatus 1 and all of the other photographing apparatuses. The controller 105 may determine any one of the photographing apparatus 1 and all of the other photographing apparatuses as the main photographing apparatus, based on an adjacent positional relationship between the photographing apparatus 1 and the other photographing apparatus detected by the apparatus position detector 106. For example, a photographing apparatus located on the left or the center may be determined as the main photographing apparatus.

In order to improve the accuracy of the capture timing when the still image is simultaneously captured by the photographing apparatuses according to the timing signal, the controller 105 may execute a preliminary adjustment for equalizing a standard time of the other photographing apparatus to a standard time of the photographing apparatus 1.

Also, the controller 105 may include a timer function for determining a waiting time that elapses from the capture instruction of the user until the still images are respectively and simultaneously captured for the first time via the photography unit 101 and the other photographing apparatus at the time specified by the timing signal. Also, after the still image capture instruction, if the still images are respectively and simultaneously captured multiple times via the photography unit 101 and the other photographing apparatus at the time specified by the timing signal, the controller 101 may also determine a still image capture time interval by using the timer function. The waiting time and the still image capture time interval determined by the timer function are transmitted to the other photographing apparatus using the communication unit 102. Therefore, even when using the timer function to capture the panorama image, respective capture timings of the still images of the panorama image may be matched with flexibility and high accuracy.

Also, when the still image is simultaneously captured by the photographing apparatuses according to the timing signal, the controller 105 may control the other photographing apparatuses to simultaneously emit light on respective subjects by using a flash function included the photographing apparatuses. Therefore, the time that elapses when the photographing apparatuses execute the flash function on all areas of the panorama image may be equalized with high accuracy.

Hereinafter, the photographing apparatus 1 is assumed as the main photographing apparatus for convenience of description.

Referring to FIG. 4, the controller 105 transmits the timing signal from the communication unit 102 to the other photographing apparatus (S407). When the timing signal is received by the other photographing apparatus, the photography unit 101 and the other photographing apparatus simultaneously capture the still image based on the timing signal (S408).

Figure 7:
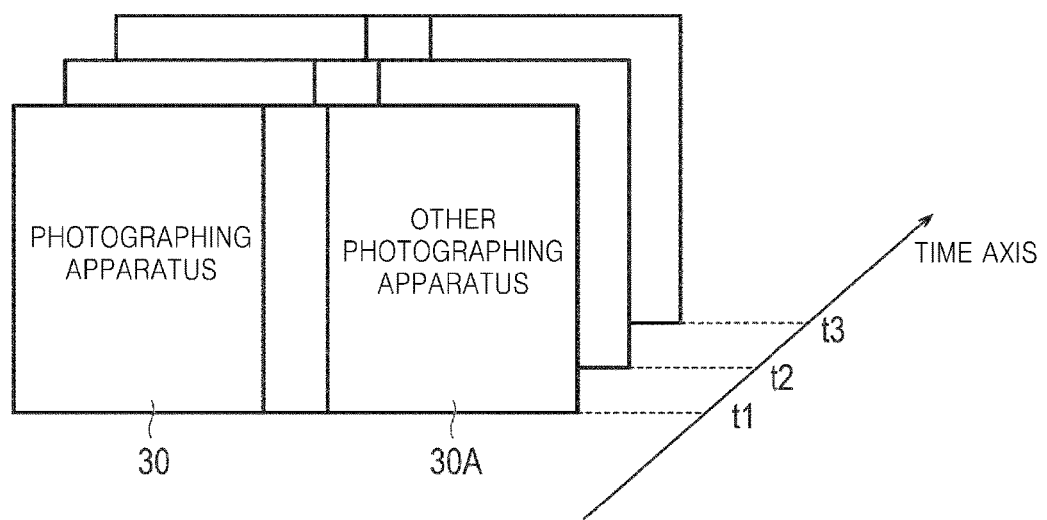
FIG. 7 is diagram illustrating a function that sequentially captures a plurality of still images by each photographing apparatus with respect to a still image capture instruction, and selects a combination of the plurality of still images to generate a panorama image, according to an embodiment.

FIG. 7 is a diagram illustrating a function that sequentially captures a plurality of still images by each photographing apparatus with respect to a still image capture instruction by a user, and selects a combination of the plurality of still images so as to generate a panorama image, according to an embodiment.

As illustrated in FIG. 7, a still image 30 is captured by the photographing apparatus 1, and a still image 30A is captured by the other photographing apparatus. When the user inputs the still image capture instruction once, three still images are sequentially and respectively captured at a time t1, a time t2, and a time t3. Then, among the three captured still images, the user may select an image combination that is the most appropriate for combining and generating the panorama image.

For example, when the user selects to prioritize an equalization of the respective capturing positions of the photographing apparatuses, a still image combination having the least difference in the respective capturing positions of the photographing apparatus is selected as a still image combination for combining and generating the panorama image. In this case, if a combination of a first still image captured by the photographing apparatus 1 and a third still image captured by the other photographing apparatus is the still image combination having the least difference in the respective capturing positions of the photographing apparatus, then that combination is selected. The respective capturing positions of the photographing apparatus 1 and the other photographing apparatus are not fixed, and the respective users of the photographing apparatuses capture the still image may create respective photographing conditions for the photographing apparatuses, and thus it is difficult to match respective viewing angles of the photographing apparatuses. Therefore, a hand tremble effect may be reduced by selecting the still image combination having the least difference in the respective capturing positions of the photographing apparatus.

In addition, when the user selects to prioritize respective capture times of the still images, a still image combination for combining and generating the panorama image may be selected by following a process described hereinafter. That is, from among a combination of still images captured at the time t1, a combination of still images captured at the time t2, and a combination of still images captured at the time t3, a combination having the most desirable panorama image generation result is selected, the capture time may be added to the still image received by the communication unit 102, and then the respective capture time of the still images may be determined based on the capture time added when capturing the still image.

Respective still image photographing conditions for the photographing apparatuses may be the same. Then, the controller 105 may determine a common photographing condition for all of the photographing apparatuses, transmit the determined photographing condition to the other photographing apparatus, and then capture the still image via all photographing apparatuses under the determined photographing condition. Here, the photographing condition indicates various capturing settings that determine a quality of the still image, such as shutter speed, brightness, or the number of pixels. Thus, the user may be prevented from capturing an unnatural panorama image due to different still image photographing conditions.

The controller 105 may receive a feature of the other photographing apparatus as a photographing performance, extract a common photographing performance between the photography unit 101 and all of the other photographing apparatuses, and determine the common photographing condition for all of the photographing apparatuses based on the extracted photographing performance. Then, the controller 105 may transmit the determined photographing condition to the other photographing apparatus, and capture the still image via the photography unit 101 and the other photographing apparatus under the common photographing condition. For example, even if one of the photographing apparatuses is capable of capturing at a fast shutter speed of $\frac{1}{8000}$, if all of the other photographing apparatuses are not capable of capturing at a shutter speed more than a shutter speed of $\frac{1}{4000}$, the controller 105 extracts the shutter speed of $\frac{1}{4000}$ as the common photographing performance. Then, the common photographing performance is determined as the shutter speed of $\frac{1}{4000}$.

When a common photographing condition does not exist between the photography unit 101 and all of the other photographing apparatuses and thus it is not possible to extract a common photographing performance between the photography unit 101 and all of the other photographing apparatuses, the controller 105 may stop the photography unit 101 and all the other photographing apparatuses from capturing the still image. Also, if a common photographing performance exists between the photography unit 101 and all of the other photographing apparatuses by excluding any one of the photographing apparatuses, the controller 105 may extract a common photographing performance between the remaining photographing apparatuses and the photography unit 101. In this case, the image processor 107 generates the panorama image by combining still images captured by the remaining photographing apparatuses and the photography unit 101. Here, an exclusion notice may be transmitted to the excluded photographing apparatus among the other photographing apparatuses, and a purpose of the exclusion may be displayed on the excluded photographing apparatus.

Alternatively, the photographing condition may be determined by the other photographing apparatus. To do so, a capturing feature of the photographing apparatus 1 is transmitted from the photographing apparatus 1 to the other photographing apparatus, and a photographing condition determined by the other photographing apparatus is transmitted from the other photographing apparatus to the photographing apparatus 1. Then, the photography unit 101 may capture the still image under the photographing condition received from the other photographing apparatus.

Referring to FIG. 4, the communication unit 102 receives the still image captured by the other photographing apparatus from the other photographing apparatus (S409).

The image processor 107 generates the panorama image by overlapping and combining the common portion, which is detected by the apparatus position detector 106, between the still image captured by the photography unit 101 and the still images captured by all of the other photographing apparatuses (S410).

The record unit 110 then records the generated panorama image (S411).

As described above, the photographing apparatus 1 according to an embodiment captures the moving image and the still image, receives the moving image and the still image captured by the other photographing apparatus from the other photographing apparatus, and detects the common portion between the moving images and the still images. Then, the positional relationship between the photographing apparatuses is recognizably displayed, by overlapping and combining the detected common portion of the moving image captured by the photographing apparatus 1 and at least a portion of the moving image captured by the other photographing apparatus. Then, the panorama image is generated by overlapping and combining the detected common portion of the still images respectively captured by the photographing apparatuses under the positional relationship. Thus, the respective positions of the photographing apparatuses capturing the still images of the panorama image may be optimized, and thus the simultaneously captured still images may be quickly overlapped. Accordingly, even when a subject is moving, it may be possible to quickly capture the panorama image without having the same subject be repeatedly included in the panorama image.

Also, according to the present embodiment, the advantage of capturing the panorama image by using a plurality of photographing apparatuses and the advantage of capturing the panorama image by using a single photographing apparatus may be combined. That is, when the plurality of photographing apparatuses are used, an image and a capturing range of the panorama image may be recognized in advance from the panorama moving image, a moving subject may be captured, and a linear flat image having no distortion may be captured. Also, since the photographing apparatus is not fixed and the number of photographing apparatuses for capturing the still image is not limited, a viewing angle may be freely set, and an inexpensive and flexible panorama image capturing system may be composed.

Hereinafter, an electronic apparatus (e.g., a photographing apparatus) according to another embodiment is described. The present embodiment is different from the previous embodiment in that a relative directional difference between the photographing apparatus and another photographing apparatus is recognizably displayed in the combined moving image. Thus, the user is notified to adjust respective photographing directions of the photographing apparatuses so as to reduce the relative directional difference. Detailed descriptions of features that are the same as the previous embodiment are omitted.

Figure 8:
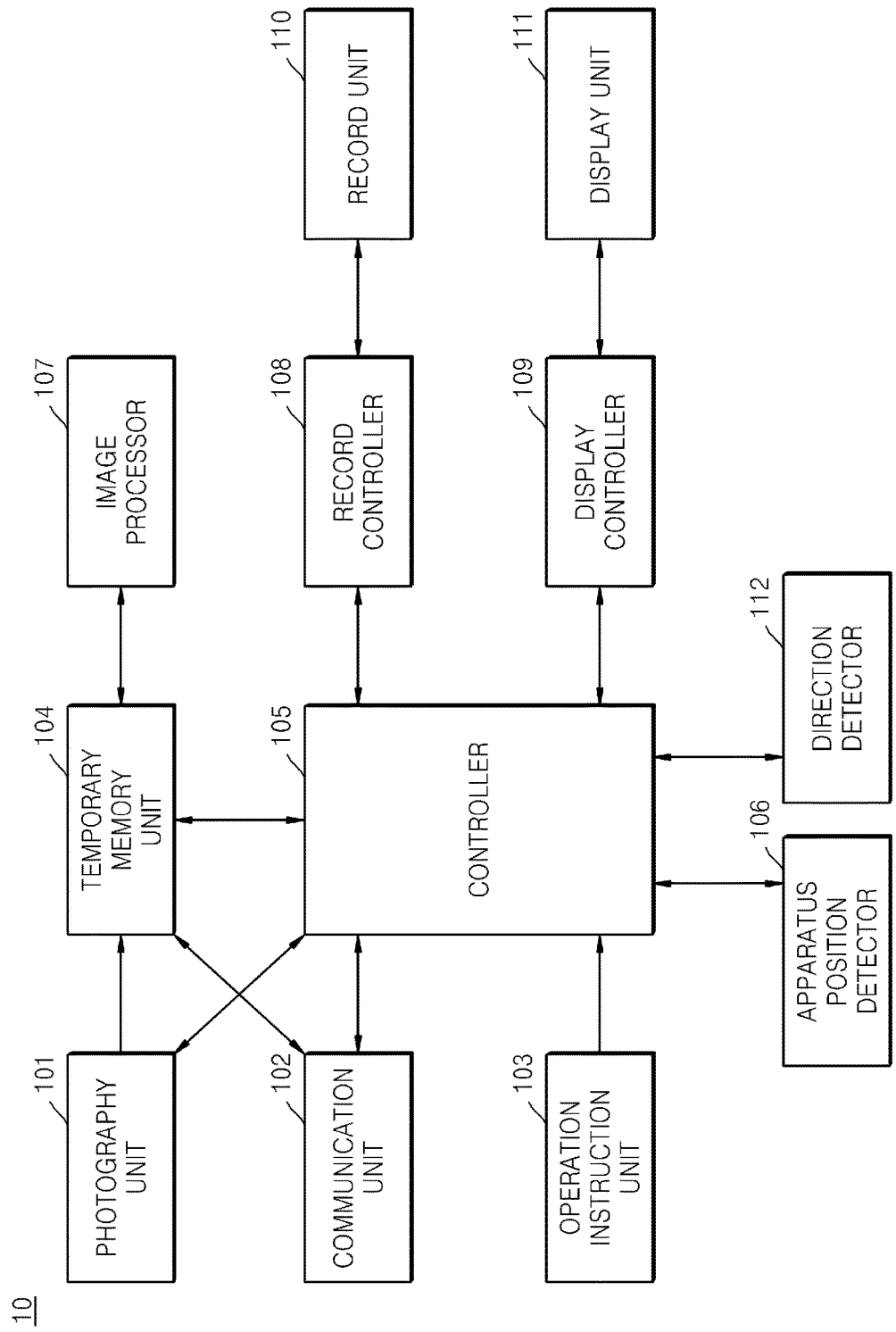
FIG. 8 is a block diagram of an electronic apparatus, according to another embodiment.

FIG. 8 is a block diagram of an electronic apparatus 10 (e.g., a photographing apparatus 10) according to another embodiment.

A direction detector 112 may be configured as a digital direction system.

The direction detector 112 detects a direction of an optical axis of the photography unit 101 as a photographing direction. The controller 105 calculates a relative directional difference between the photographing direction detected by the direction detector 112 and a photographing direction of the other photographing apparatus that are received by the communication unit 102, and recognizably displays the relative directional difference on the display unit 111 for the user.

Figure 9:
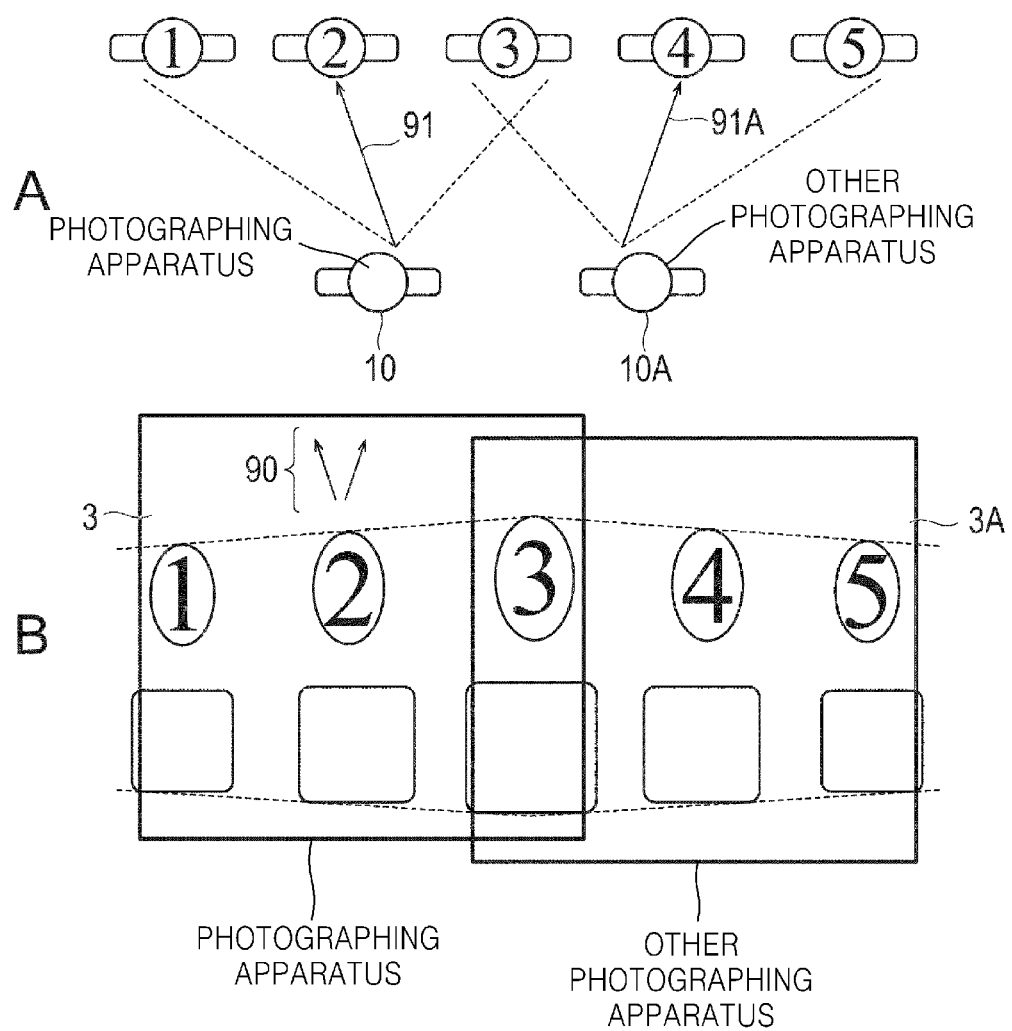
FIGS. 9A and 9B are diagrams illustrating photographing directions of a photographing apparatus and another photographing apparatus, and combined moving images respectively displayed on the photographing apparatuses.

FIGS. 9A and 9B are diagrams illustrating the respective photographing directions of the photographing apparatus 10 and another photographing apparatus 10A, and the combined moving images respectively displayed on the photographing apparatuses FIG. 9A is a diagram illustrating the respective photographing directions of the photographing apparatus 10 and the other photographing apparatus 10A.

As illustrated in FIG. 9A, a first subject, a second subject, and a third subject are captured by the photographing apparatus 10. A photographing direction 91 of the photographing apparatus 10 is shown with an arrow. Also, the third subject, a fourth subject, and a fifth subject are captured by the other photographing apparatus 10A. A photographing direction 91A of the other photographing apparatus 10A is shown with an arrow. In FIG. 9A, the photographing direction 91 of the photographing apparatus 10 is not the same as the photographing direction 91A of the other photographing apparatus 10A.

FIG. 9B is a diagram illustrating the combined moving images 3 and 3A respectively displayed on the photographing apparatuses 10 and 10A.

As illustrated in FIG. 9B, since the photographing directions 91 and 91A of the photographing apparatus 10 and the other photographing apparatus 10A are not the same, the first to third subjects having the same heights may be captured as if having different heights. Therefore, a relative directional difference 90 between the photographing directions of the photographing apparatus 10 and the other photographing apparatus 10A is displayed by using arrows in the combined moving image 3 with an angle therebetween, so that the user may recognize a difference between the photographing directions of the photographing apparatus 10 and the other photographing apparatus 10A.

Figure 10:
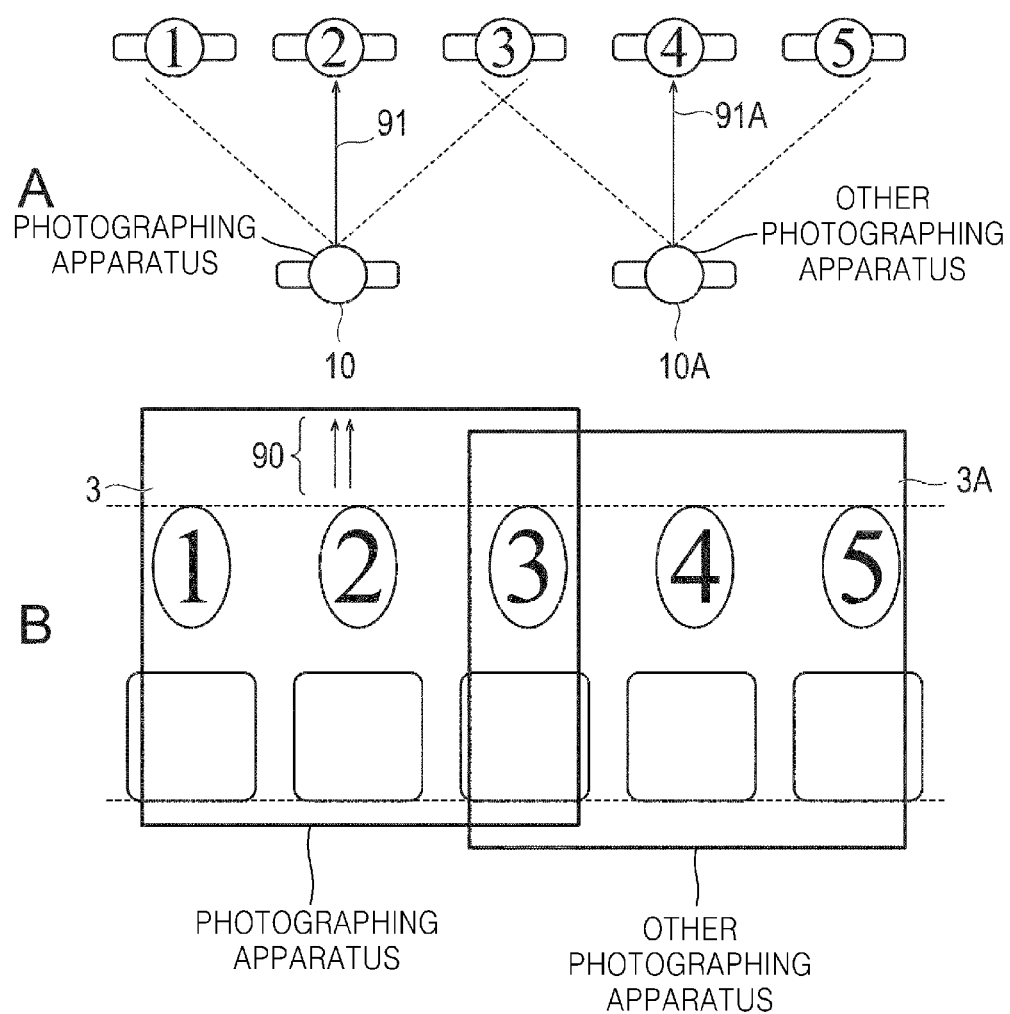
FIGS. 10A and 10B are diagrams illustrating respective photographing directions and combined moving images respectively displayed on a photographing apparatus and another photographing apparatus, when there is no relative directional difference between the respective photographing directions of the photographing apparatuses, according to an embodiment.

FIGS. 10A and 10B are diagrams illustrating respective photographing directions and the combined moving images respectively displayed on the photographing apparatus 10 and the other photographing apparatus 10A, when there is no relative directional difference between the respective photographing directions of the photographing apparatuses 10 and 10A.

In FIG. 10A, the photographing direction 91 of the photographing apparatus 10 is the same as the photographing direction 91A of the other photographing apparatus 10A.

FIG. 10B is a diagram illustrating the combined moving images 3 and 3A respectively displayed on the photographing apparatuses 10 and 10A, when there is no relative directional difference between the respective photographing directions of the photographing apparatuses.

As illustrated in FIG. 10B, since the photographing directions 91 and 91A of the photographing apparatus 10 and the other photographing apparatus 10A are the same, the first to third subjects having the same heights are captured as subjects having the same height. In the combined moving image 3, an angle of parallel arrows represents that the relative directional difference 90 between the photographing directions 91 and 91A of the photographing apparatus 10 and the other photographing apparatus 10A equals 0. Thus, the user may recognize that the photographing directions 91 and 91A of the photographing apparatus 10 and the other photographing apparatus 10A are not different, and understand that there is no need to adjust the photographing directions 91 and 91A of the photographing apparatus 10 and the other photographing apparatus 10A.

Since a relative directional difference between a moving image photographing direction of the photographing apparatus 10 and a moving image photographing direction of the other photographing apparatus 10A is recognizably displayed on the combined moving image 3, the user may recognize a difference between the moving image photographing directions of the photographing apparatus 10 and the other photographing apparatus 10A. Therefore, the user may adjust the moving image photographing directions of the photographing apparatus 10 and the other photographing apparatus 10A so that the relative directional difference disappears. The common portion between still images respectively captured by the photographing apparatuses may be combined in the adjusted state, and thus the generated 2-dimensional (2D) panorama image may have a small amount of distortion.

As described above, the photographing apparatus 10 according to another embodiment detects the moving image photographing directions of the photographing apparatus 10 and the other photographing apparatus 10A, and recognizably displays the relative directional difference in the combined moving image. Then, the respective photographing directions of the photographing apparatuses are adjusted so that the relative directional difference is eliminated. By overlapping and combining the detected common portions of the still images respectively captured in the adjusted photographing apparatuses, and the panorama image is thus generated. Thus, the 2D panorama image having a small amount of distortion may be generated.

An electronic apparatus (e.g., a photographing apparatus) according to one or more embodiments is not limited to the descriptions above.

For example, from among the photographing apparatus and the alternative photographing apparatuses, a main photographing apparatus may operate all of the alternative photographing apparatuses. In this case, when a user of a photographing apparatus other than the main photographing apparatus operates the photographing apparatus (which is not the main photographing apparatus), the operation is ineffective. Also, the main photographing apparatus may be determined based on a positional relationship between the photographing apparatuses. For example, a photographing apparatus at the center may be the main photographing apparatus. Alternatively, the user of a photographing apparatus may select a method of determining the main photographing apparatus. For example, a user of the photographing apparatus may determine the main photographing apparatus by selecting the photographing apparatus at the center or the left side. Thus, the user may quickly capture a panorama image having the user's desired features.

A communication unit receives at least one of a moving image, which is captured by at least one of the other photographing apparatuses, and a combined moving image of the moving image captured by at least one of the other photographing apparatuses, from the other photographing apparatus. Then, an image processor may generate the panorama moving image by combining at least one of the received moving image and the received combined moving image. That is, for example, the photographing apparatus may use a combined moving image that is combined by another photographing apparatus, and generate the panorama image by combining moving images that are not included in the combined moving image. Thus, the panorama image may be quickly generated with flexibility.

A capturing time may be added to the moving image captured by the other photographing apparatus. A time necessary for combining and generating the combined moving image and the panorama moving image may be reduced by synchronizing the capturing time added to the moving image that is captured by the other photographing apparatus and the capturing time added to a moving image that is captured by a photography unit.

As described above, according to one or more embodiments, a photographing apparatus according to an embodiment transmits or receives moving images and still images captured by the photographing apparatus and another photographing apparatus. The photographing apparatus detects a common portion between the moving images and the still images. Also, the common portion of the moving image captured by the photographing apparatus and at least a portion of the moving images captured by the other photographing apparatuses are overlapped and then combined so that a positional relationship between the photographing apparatuses is recognizably displayed. In addition, a panorama image is generated by overlapping and combining the detected common portion between the still images respectively captured by the photographing apparatuses in the positional relationship. Thus, since respective positions of the photographing apparatuses capturing the still images are optimized, simultaneously captured still images may be quickly overlapped. Therefore, even when a subject is moving, it may be possible to capture the panorama image without having the same subject be repeatedly included in the panorama image.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. An electronic apparatus for capturing a panorama image, the electronic apparatus comprising:
   a photography unit that captures a moving image and a still image;
   a transmitter that transmits the moving image and the still image captured by the photography unit to a second electronic apparatus;
   a receiver that receives a moving image and a still image captured by the second electronic apparatus;
   a common portion detector that detects a common portion between the moving image captured by the photography unit and the moving image received by the receiver, and detects a common portion between the still image captured by the photography unit and the still image received by the receiver;
   a combined moving image generation unit that generates a combined moving image that displays a positional relationship between the electronic apparatus and the second electronic apparatus, wherein the combined moving image generation unit overlaps and combines the moving image captured by the photography unit, at least a portion of the moving image captured by the second electronic apparatus received by the receiver, and the common portion detected by the common portion detector;
   a display unit that displays the combined moving image generated by the combined moving image generation unit; and
   a panorama image generation unit that generates the panorama image by overlapping and combining the still image captured by the photography unit, the still image captured by the second electronic apparatus, and the common portion detected by the common portion detector, according to the positional relationship; and
   a panorama moving image generation unit that generates a panorama moving image by overlapping and combining the moving image captured by the photography unit, the moving image captured by the second electronic apparatus received by the receiver, and the common portion detected by the common portion detector,
   wherein the photography unit and the second electronic apparatus respectively capture a plurality of still images according to one capture instruction, and
   wherein from among the combinations of the still images respectively captured by the photography unit and the second electronic apparatus, the panorama image generation unit generates the panorama image by combining a set of still images having a similar capturing time or a set of still images having the least difference between the relative positions,
   wherein the display unit displays the panorama moving image generated by the panorama moving image generation unit,
   wherein a capturing time is added to the moving image received by the receiver,
   wherein the combined moving image generation unit generates the combined moving image by synchronizing a capturing time of the moving image captured by the photography unit and a capturing time of at least a portion of the moving image captured by the second electronic apparatus, and
   wherein the panorama moving image generation unit generates the panorama moving image by synchronizing the capturing time of the moving image captured by the photography unit and capturing times of the moving images respectively captured by a plurality of electronic apparatuses.

2. The electronic apparatus of claim 1, wherein:
   when the moving image captured by the photography unit, the moving image captured by the second electronic apparatus received by the receiver, and the common portion detected by the common portion detector are overlapped, the display unit displays a positional relationship between the electronic apparatus and the second electronic apparatus adjacent to the electronic apparatus; and
   the display unit displays a portion of the moving image that is captured by the second electronic apparatus in a frame of the moving image captured by the electronic apparatus, wherein the frame of the moving image captured by the electronic apparatus and a frame of the moving image captured by the second electronic apparatus are distinguishable.

3. The electronic apparatus of claim 1, further comprising:
   a photographing condition determination unit that determines a photographing condition of a still image that is common between the photography unit and the second electronic apparatus,
   wherein the transmitter transmits the photographing condition to the second electronic apparatus so that the still image is captured by the second electronic apparatus under the photographing condition determined by the photographing condition determination unit,
   wherein the receiver receives a photographing condition determined by the second electronic apparatus from the second electronic apparatus, and
   wherein the electronic apparatus captures the still image under the photographing condition determined by the photographing condition determination unit or the photographing condition received by the receiver.

4. The electronic apparatus of claim 1, further comprising:
   a timing signal generation unit that generates a timing signal for simultaneously capturing the still image via the photography unit and the second electronic apparatus, based on an image capture instruction,
   wherein the transmitter transmits the timing signal generated by the timing signal generation unit to the second electronic apparatus,
   wherein the photography unit captures the still image at a time according to the timing signal,
   wherein the receiver receives, from the second electronic apparatus, the still image captured by the second electronic apparatus at the time according to the timing signal that is transmitted by the timing signal generation unit, and wherein the panorama image generation unit generates the panorama image by combining the still image captured by the photography unit at the time according to the timing signal and the still image captured by the second electronic apparatus at the time according to the timing signal received by the receiver.

5. The electronic apparatus of claim 1, further comprising:

a photographing direction detector that detects a photographing direction of the photography unit, wherein the transmitter transmits the photographing direction of the photography unit detected by the photographing direction detector to the second electronic apparatus, wherein the receiver receives a photographing direction of the second electronic apparatus from the second electronic apparatus, wherein the display unit displays a relative directional difference between the photographing direction detected by the photographing direction detector and the photographing direction of the second electronic apparatus that is received by the receiver, and wherein the panorama image generation unit generates the panorama image by overlapping and combining the still image captured by the photography unit according to the relative directional difference between the photographing directions, the still image captured by the second electronic apparatus according to the relative directional difference between the photographing directions, and the common portion detected by the common portion detector.

6. The electronic apparatus of claim 4, further comprising:

an adjacency relationship detector that detects an adjacency relationship between the electronic apparatus and the second electronic apparatus; and a main electronic apparatus determination unit that determines any one of the electronic apparatus and the second electronic apparatus as a main electronic apparatus for transmitting the timing signal, based on the adjacency relationship detected by the adjacency relationship detector, wherein the transmitter transmits a signal that specifies the main electronic apparatus with respect to the second electronic apparatus.

7. The electronic apparatus of claim 3, wherein:

the transmitter transmits a photographing performance of the electronic apparatus to the second electronic apparatus, the receiver receives a photographing performance of the second electronic apparatus from the second electronic apparatus, the electronic apparatus further comprises a photographing performance extraction unit that extracts a common photographing performance between the photographing performance of the photography unit and the photographing performance of the second electronic apparatus, based on the photographing performance of the photography unit and the photographing performance of the second electronic apparatus received by the receiver, and the photographing condition determination unit determines the photographing condition based on the photographing performance extracted by the photographing performance extraction unit.

8. The electronic apparatus of claim 7, wherein when the photographing performance extraction unit determines that there is no common photographing performance between the electronic apparatus and the second electronic apparatus, the photography unit stops capturing the still image.

9. The electronic apparatus of claim 7, wherein:

when the photographing performance extraction unit determines that a common photographing performance exists between all but one of a plurality of electronic apparatuses and the photography unit, the electronic apparatus not having the common photographing performance is excluded, the photographing performance extraction unit extracts the common photographing performance between the remaining electronic apparatuses and the photography unit, and the panorama image generation unit generates the panorama image by combining still images respectively captured by the remaining electronic apparatuses and the photography unit.

10. The electronic apparatus of claim 1, further comprising:

a zoom execution unit that zooms out the moving image captured by the photography unit to a wide angle end, or displays a zoom identifier on the display unit, before the common portion is detected by the common portion detector.

11. The electronic apparatus of claim 1, wherein:

the combined moving image generation unit generates a combined external moving image that displays the positional relationship between second adjacent electronic apparatuses, the combined moving image generation unit overlaps at least a portion of the moving image and a second moving image received by the receiver, and the common portion that is detected by the common portion detector, and the display unit convertibly displays the combined external moving image and the combined moving image.

12. The electronic apparatus of claim 1, further comprising:

an external apparatus operation unit that operates the second electronic apparatus, and simultaneously invalidates an operation command by the second electronic apparatus.

13. The electronic apparatus of claim 1, further comprising:

an external apparatus inducing unit that displays a mark on any one of the electronic apparatuses to indicate a position to which the one electronic apparatus should be moved, based on an input instruction.

14. The electronic apparatus of claim 2, wherein:

the receiver receives, from at least one of a plurality of electronic apparatuses, at least one of a moving image captured by the at least one electronic apparatus and a combined moving image of the moving image captured by the at least one electronic apparatus, and the panorama moving image generation unit generates the panorama image by combining the moving image captured by the at least one electronic apparatus and the combined moving image of the moving image captured by the at least one electronic apparatus.

15. The electronic apparatus of claim 1, further comprising:

an external apparatus adjustment unit that adjusts a capturing timing standard time of the second electronic apparatus to be the same as a capturing timing standard time of the electronic apparatus.

16. The electronic apparatus of claim 1, wherein:
from among combinations of the plurality of still images respectively captured by the photography unit and the second electronic apparatus, the panorama image generation unit generates the panorama image by combining a still image combination based on an input selection.

17. The electronic apparatus of claim 6, further comprising:
a timer unit, which when the main electronic apparatus determination unit determines the electronic apparatus as the main capturing apparatus, determines at least one of a waiting time and a time interval,
wherein the waiting time is a time period that elapses from the image capture instruction until the still images are respectively and simultaneously captured for the first time by the photography unit and the second electronic apparatus at the time according to the timing signal,
wherein the time interval is a time period when the still images are respectively and simultaneously captured multiple times by the photography unit and the second electronic apparatus at the time according to the timing signal, after the image capture instruction, and
wherein the transmitter transmits at least one of the waiting time and the time interval determined by the timer unit to the second electronic apparatus.

\* \* \* \* \*